United States Patent [19]

Hess et al.

[11] 4,382,433

[45] May 10, 1983

[54] COMBINED HUMIDISTAT AND ELECTRONIC AIR FLOW RESPONSIVE SWITCH

[75] Inventors: George E. Hess, St. Louis, Mo.; Donald E. Donnelly, Edwardsville, Ill.; Robert E. Reinwart, St. Louis, Mo.

[73] Assignee: Emerson Electric Co., St. Louis, Mo.

[21] Appl. No.: 370,982

[22] Filed: Apr. 22, 1982

[51] Int. Cl.$^3$ .............................. F24F 3/14; G01F 1/68
[52] U.S. Cl. ........................................ 126/113; 73/204; 236/44 A
[58] Field of Search .......................... 126/113; 73/204; 62/176 E; 236/44 A, 44 R; 165/20

[56] References Cited

U.S. PATENT DOCUMENTS

| | | | |
|---|---|---|---|
| 3,193,641 | 7/1965 | Krueger | 73/336 X |
| 3,989,486 | 11/1976 | Baysinger | 55/105 |
| 4,264,961 | 4/1981 | Nishimura et al. | 73/204 X |

OTHER PUBLICATIONS

Honeywell Installation Instructions for H49X1024, Form Number 95-6248, Apparent Date 1-64.
Honeywell Document Entitled "Humidifier Controllers", Form Number 60-2100, Apparent Date 11-75.

Primary Examiner—William E. Wayner
Attorney, Agent, or Firm—Paul A. Becker, Sr.

[57] ABSTRACT

An electronic air flow responsive switch is connected in circuit with a humidistat switch for controlling operation of a humidifier in a forced air heating system. The air flow responsive switch includes a self-heating PTC (positive temperature coefficient) thermistor which enables operation of the humidifier only when the humidistat switch is closed and there exists sufficient air flow for cooling the thermistor. The air flow responsive switch and humidistat switch are mounted in a single enclosure and include plug and cord arrangements for simplifying installation of the device.

4 Claims, 3 Drawing Figures

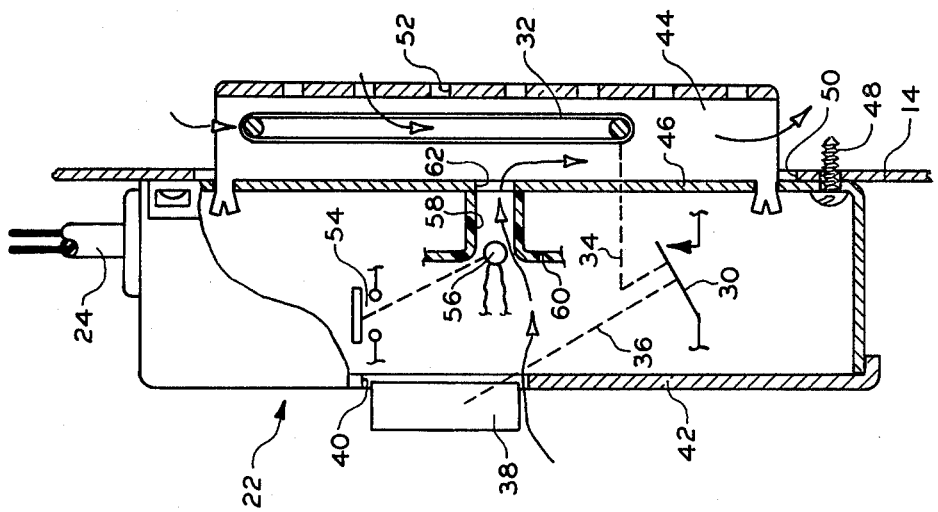
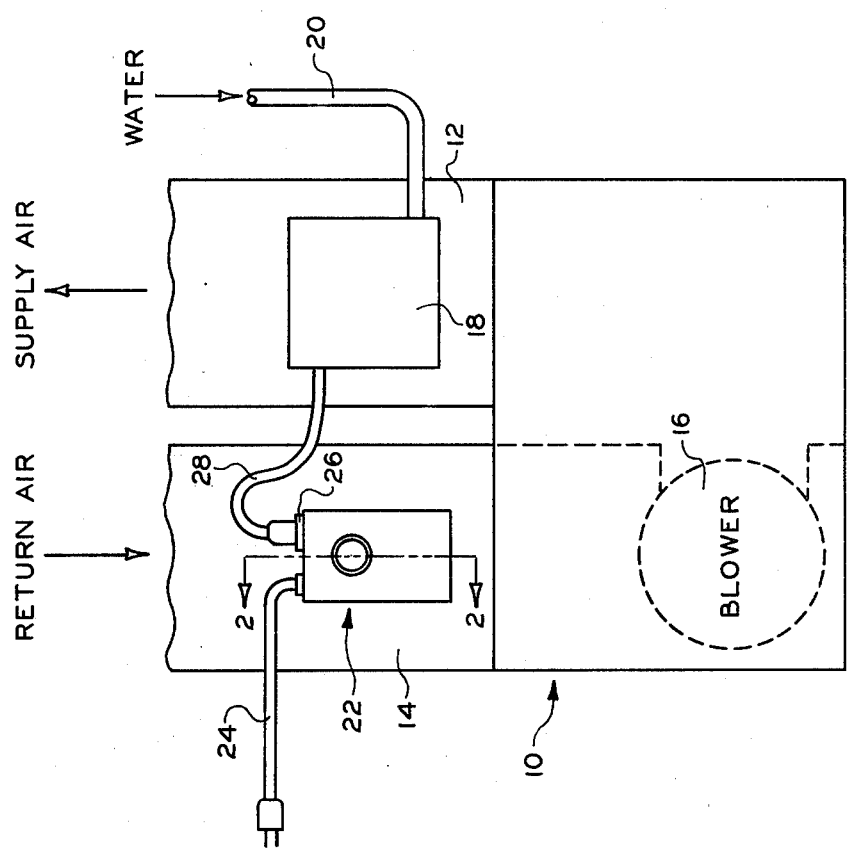

4,382,433

COMBINED HUMIDISTAT AND ELECTRONIC AIR FLOW RESPONSIVE SWITCH

BACKGROUND OF THE INVENTION

This invention relates to devices for controlling operation of a humidifier in a forced air heating system.

It is desirable, in controlling operation of a humidifier in a forced air heating system, to energize the humidifier only when the furnace blower is energized. Generally, such operation maximizes the desired addition of moisture to the circulating air and minimizes the development of mineral deposits and corrosive agents.

A known prior art device for accomplishing the stated desired operation comprises a combined humidistat and sail-switch, model H49X, made by Honeywell. When the device is utilized, the sail portion of the sail-switch is located in an opening of a duct through which the air is forcibly circulated. Movement of the sail by the circulating air places the humidistat switch in an operable mode to enable it to perform its function of operating the humidifier in response to the relative humidity of the circulating air as sensed by a humidity sensing means located in the same duct opening as the sail. The referenced device also includes a plug and cord arrangement which eliminates having to make electrical connections with the blower motor wiring, thus simplifying installation of the humidification system.

While such a combined humidistat and sail-switch provides the desired system operation, it requires proper installation of the sail associated with the sail-switch. Also, in some applications, the sail must be trimmed to fit into the duct, thus making the installation somewhat more difficult and time consuming.

SUMMARY OF THE INVENTION

Accordingly, it is an object of the invention to provide a combined humidistat and air flow responsive switch incorporating a generally new and improved air flow responsive switch.

A further object is to provide a combined humidistat and air flow responsive switch adapted to be mounted on an air duct of a forced air heating system wherein the air flow responsive switch includes a self-heating thermistor, a comparator circuit, and a relay, the relay winding being in series with the humidistat switch and the relay contacts being in series with circuit means connected to the humidifier; wherein the thermistor self-heats in the absence of circulating air to prevent energizing of the relay winding; and wherein the thermistor is cooled due to circulating air, when it exists, to effect energizing of the relay winding.

These and other objects and features of the present invention will become apparent from the following description when read in conjunction with the accompanying drawings.

BRIEF DESCRIPTION OF THE DRAWINGS

FIG. 1 is an elevational view of a furnace embodying the combined humidistat and air flow responsive switch of the present invention;

FIG. 2 is a partial cross-sectional view taken along line 2—2 of FIG. 1; and

DESCRIPTION OF THE PREFERRED EMBODIMENT

Figure 3:
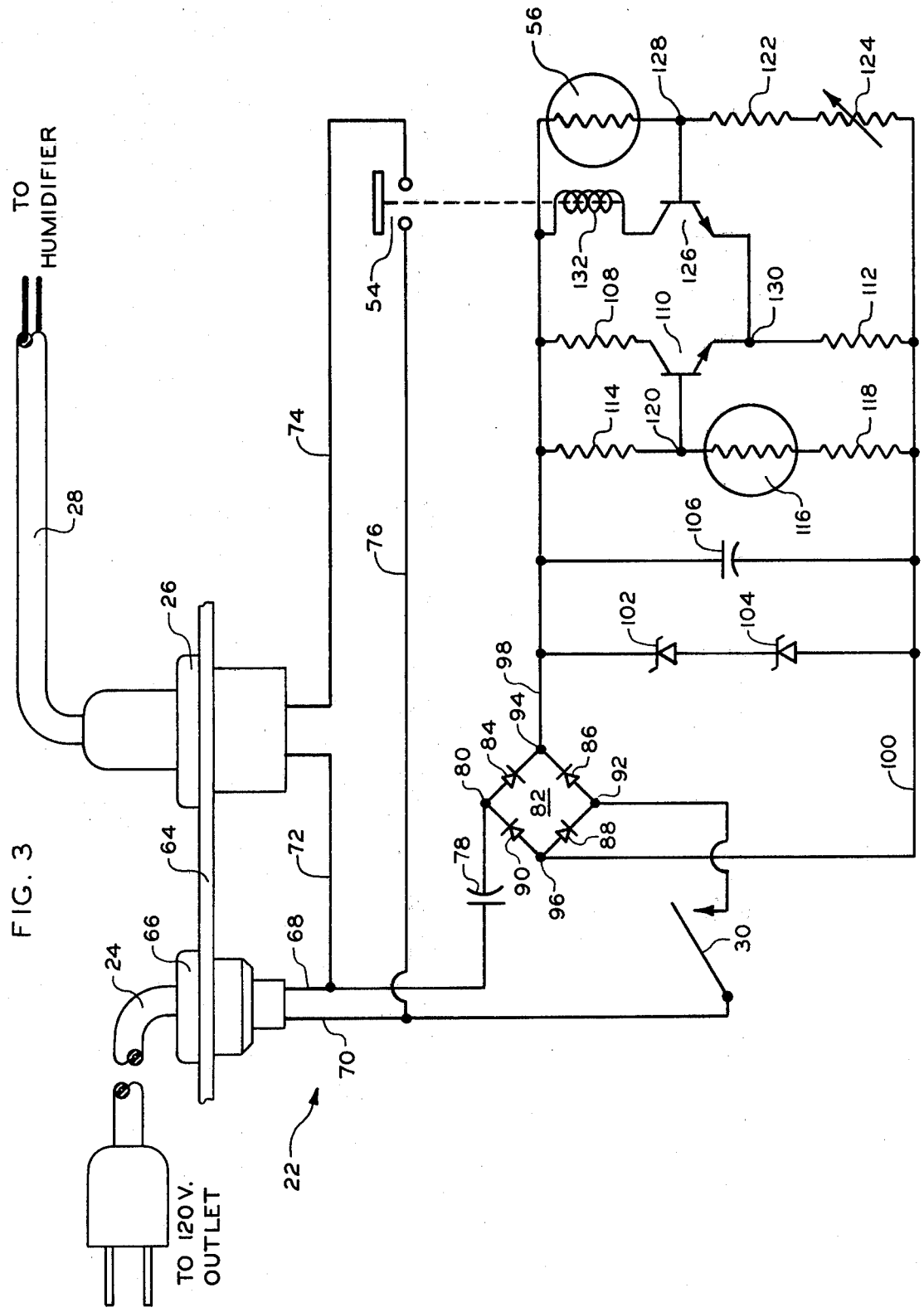
FIG. 3 is a diagrammatic illustration of the combined humidistat and air flow responsive switch.

Referring to FIG. 1, shown therein is a warm air furnace 10 having a supply air duct 12, a return air duct 14, and a blower 16 which circulates air through ducts 12 and 14 and the space to be heated. Mounted on a wall of supply air duct 12 is a humidifier 18. Humidifier 18 can be any conventional electrically operated type such as the type utilizing a rotating media wheel or the type utilizing a spray nozzle. The water supply for humidifier 18 is provided by tubing 20 which leads from humidifier 18 to any convenient water supply (not shown).

Mounted on return air duct 14 is the combined humidistat switch and air flow responsive switch device 22 of the present invention. Device 22 is provided with a plug and cord 24 for electrical connection to a conventional 120 volt alternating current outlet (not shown), and with a receptacle 26 for accepting another plug and cord 28 attached to humidifier 18. Such a plug and cord arrangement negates the need for electrical connections with any existing wiring, thus simplifying installation. As previously noted, such a plug and cord arrangement is well known in the art.

Referring to FIG. 2, device 22 includes a humidistat switch 30 operable to an open and closed contact position in response to expansion and contraction of a humidity sensing element 32 which is connected to humidistat switch 30 by conventional mechanical linkage means 34. The operating or set point of humidistat switch 30 is adjustable through other conventional mechanical linkage means 36 by a knob 38 which extends through an aperture 40 in a cover 42 of device 22. An illustration of the details of construction of linkage means 34 and 36 is not considered to be essential to enable understanding of the present invention and, accordingly, is omitted. Reference may be had to U.S. Pat. No. 3,840,176 for typical examples of such construction.

Humidity sensing element 32, typically a nylon band, is supported within a bracket 44 attached to a rear housing member 46 of device 22. Device 22 is attached by screws 48 to return air duct 14 which is apertured at 50 to allow bracket 44 to extend into the interior of return air duct 14. Bracket 44 is open at the top and bottom portions thereof, and is provided with a plurality of apertures 52 in one wall thereof, to ensure sufficient exposure of humidity sensing element 32 to the circulating air.

Device 22 also includes a set of relay contracts 54 which are operable to an open and closed contact position in response to a thermistor 56 and other circuit means to be hereinafter described. It is to be noted, in reference to FIG. 2, that thermistor 56 is positioned within a passageway 58 defined by an extruded member 60 of device 22. Member 60 abuts rear housing member 46, and passageway 58 is co-axial with an aperture 62 in rear housing member 46 so that the circulating air through return air duct 14 causes ambient air to be drawn into device 22 and past thermistor 56. Device 22 includes various openings therein, such as the clearance opening between knob 38 and cover 42, for enabling such air flow past thermistor 56.

Referring to FIG. 3, plug and cord 24 is secured to a top portion 64 of device 22 by a strain-relief bushing 66. The previously described receptacle 26 is also attached to top portion 64. Plug and cord 24 includes leads 68 and 70 between which 120 volts potential is provided when plug and cord 24 is connected to a 120 volt outlet. Plug and cord 28 includes a lead 72 connected to lead 68, and a lead 74 connected to one side of relay contacts 54. The other side of relay contacts 54 is connected by a lead 76 to lead 70.

One side of a capacitor 78 is connected to lead 68 and the other side thereof to one of the input terminals 80 of a full wave bridge 82 comprised of rectifiers 84, 86, 88, and 90. Capacitor 78 is a low power factor device which functions to reduce the voltage applied to bridge 82. Although a resistor could possibly be used, the capacitor 78 is preferred because, unlike a resistor, it emits very little heat. The previously described humidistat switch 30 is connected between lead 70 and the other input terminal 92 of bridge 82.

Connected across the output terminals 94 and 96 of bridge 82 by leads 98 and 100 are two series-connected voltage regulators 102 and 104. A capacitor 106 is also connected between leads 98 and 100. Regulators 102 and 104 and capacitor 106 provide a regulated voltage of approximately 40 volts between leads 98 and 100.

Series connected across leads 98 and 100 are a resistor 108, an NPN transistor 110, and a resistor 112. Also series connected across leads 98 and 100 are a resistor 114, an NTC (negative temperature coefficient) thermistor 116, and a resistor 118. The base of transistor 110 is connected to a junction 120 between resistor 114 and thermistor 116.

Also series connected across leads 98 and 100 are the thermistor 56, which is a PTC (positive temperature coefficient) thermistor, a resistor 122, and an adjustable resistor 124. The base of an NPN transistor 126 is connected to a junction 128 between thermistor 56 and resistor 122. The emitter of transistor 126 is connected to a junction 130 between the emitter of transistor 110 and resistor 112. Connected between lead 98 and the collector of transistor 126 is a relay winding 132 which controls relay contacts 54.

OPERATION

With plug and cord 24 connected to a 120 volt outlet, power is applied to leads 68 and 70. If humidistat switch 30 is open, power is not available on leads 98 and 100 so that relay winding 132 is de-energized and its contacts 54 are open. With contacts 54 open, power is not available to plug and cord 28, which leads to the humidifier 18.

When humidistat switch 30 closes, a circuit is completed to effect heating of thermistor 56, the circuit being: from lead 68, through dropping capacitor 78, bridge 82, lead 98, thermistor 56, resistors 122 and 124, lead 100, bridge 82, and humidistat switch 30 to lead 70. A circuit is also completed through resistor 114, thermistor 116, and resistor 118. Full wave bridge 82 is effective to provide the same voltage polarity between leads 98 and 100 when the polarity reverses on leads 68 and 70. The initial cold resistance of thermistor 56 is such that the junction 128 at the base of transistor 126 is more positive than the junction 120 at the base of transistor 110. This condition causes transistor 126 to be biased on, causing energizing of relay winding 132. Relay contacts 54 therefore close and humidifier 18 is energized, the circuit being from lead 68 through lead 72, plug and cord 28 and humidifier 18, lead 74, relay contacts 54, and lead 76 to lead 70.

In the absence of circulating air, thermistor 56 self-heats, increasing its resistance. Within several seconds, thermistor 56 increases its resistance sufficiently to reduce the base-emitter current through transistor 126, and thus the emitter-collector current, so as to effect the non-conduction of transistor 126 and enable conduction of transistor 110. With transistor 126 off, relay winding 132 is de-energized, effecting the opening of relay contacts 54 and thus de-energizing of humidifier 18. While such energizing of humidifier 18 in the absence of circulating air is basically undesirable, it is considered acceptable since it occurs for only a few seconds.

If humidistat switch 30 remains closed after the initial closing described above, thermistor 56 remains in a self-heated condition, causing transistor 126 to remain off. When blower 16 is subsequently energized, air is circulated through the space to be heated via supply air duct 12 and return air duct 14. Referring to FIG. 2, the circulating air in return air duct 14 flows past humidity sensing element 32. If the relative humidity of the circulating air is below the set point value of device 22, the humidistat switch 30 remains closed.

The flow of circulating air causes a pressure drop to develop between the air in return air duct 14 and the ambient air surrounding device 22. This pressure drop causes the ambient air to be drawn into return air duct 14. The drawn-in air flows past thermistor 56 through passageways 58 and 62 in device 22, causing a cooling of thermistor 56.

As thermistor 56 cools, its resistance decreases until it effects the turning on of transistor 126 and the turning off of transistor 110. With transistor 126 conducting, relay winding 132 is energized, causing relay contacts 54 to close. With relay contacts 54 closed, humidifier 18 is energized, causing moisture to be added to the circulating air. This condition will remain until either blower 16 is de-energized or humidistat switch 30 opens.

If humidistat switch 30 opens, due to the attainment of the desired moisture content of the circulating air as sensed by sensing element 32, the circuit to relay winding 132 is thereby broken, causing humidifier 18 to be de-energized. Thermistor 56 is also de-energized, allowing it to cool. If humidistat switch 30 closes again, during the same blower-on cycle during which it opened, the cool thermistor 56 will enable immediate re-energizing of relay winding 132. Since the circulating air still exists, thermistor 56 will be kept sufficiently cool so as to provide for continued energizing of relay winding 132.

If humidistat switch 30 remains closed during the entire blower-on cycle, the de-energizing of blower 16 terminates the pressure drop between ambient air and the air in return air duct 14. Under this condition, the self-heating thermistor 56, which remains energized since humidistat switch 30 is closed, is no longer cooled. The resistance of thermistor 56 increases, causing transistor 126 to turn off and transistor 110 to turn on. With transistor 126 off, relay winding 132 is de-energized, causing relay contacts 54 to open and thus humidifier 18 to be de-energized.

In the preferred embodiment, device 22 is calibrated, by means including adjustable resistor 124, to energize relay winding 132 when there is a circulating air flow resulting in a pressure drop of approximately 0.03 inches water column between ambient air and air in the return air duct 14. The self-heating characteristics of thermistor 56 are such that relay winding 132 is de-energized when the pressure drop is approximately 0.01 inches water column. These values of pressure drops are dependent upon the rate of self-heating and cooling of thermistor 56 with the ambient air at a known temperature.

Thermistor 116 is provided to ensure that device 22 will operate at essentially the same pressure drops, regardless of ambient air temperature. Specifically, if the ambient air temperature is relatively low, PTC thermistor 56 causes the voltage on the base of transistor 126 to become more positive and NTC thermistor 116 causes the voltage on the base of transistor 110 to also become more positive. Similarly, if the ambient air temperature is relatively high, thermistors 56 and 116 cause the voltages on the bases of transistors 126 and 110, respectively, to become less positive. Thus, while the rate of self-heating and cooling of thermistor 56 may vary due to variations in ambient air temperature, thermistor 116 ensures that the amount of such self-heating and cooling required to operate the comparator circuit arrangement of transistors 110 and 126 will vary proportionately, so that device 22 operates at essentially the same pressure drops regardless of ambient air temperature.

While the invention has been illustrated and described in detail in the drawings and foregoing description, it will be recognized that many changes and modifications will occur to those skilled in the art. For example, humidistat switch 30 could be connected in series with relay contacts 54 or in series with relay winding 132 between lead 98 and winding 132 instead of being connected in the location shown. With such connections, the system would function essentially the same as previously described except the thermistor 56 would be constantly energized. It is therefore intended, by the appended claims, to cover any such changes and modifications as fall within the true spirit and scope of the invention.

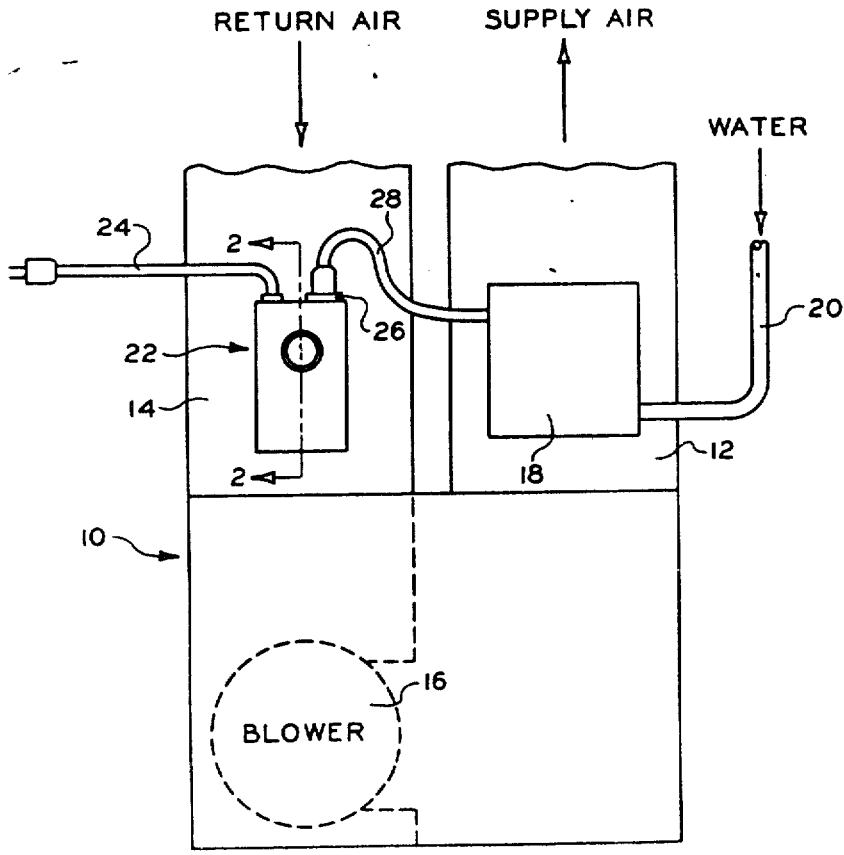

We claim:

1. In a control device adapted to be mounted on the return air duct in a forced air heating system for enabling operation of a humidifier in the presence of circulating air flow through the return air duct and preventing operation thereof in the absence of circulating air flow,
   a humidistat switch;
   a humidity sensing element exposed to the interior of the return air duct for controlling operation of said humidistat switch in response to relative humidity of air within said return air duct;
   a thermistor mounted in a restrictive passageway in communication with ambient air surrounding the device and with said air within said return air duct; and
   circuit means connected in circuit with said humidistat switch for effecting heating of said thermistor, for effecting energizing of said humidifier in response to cooling of said heated thermistor by ambient air flow through said passageway past said thermistor, said ambient air flow being caused by a pressure drop between said ambient air and said air in said return air duct when the circulating air flow exists, and for effecting de-energizing of said humidifier in the absence of said cooling when said circulating air flow does not exist.

2. The control device claimed in claim 1 further including a relay having a winding and a set of contacts, and wherein said circuit means includes said relay winding and first and second transistors having their emitters connected together, said relay winding being connected in series with one of said transistors and, when energized, being effective to close said contacts to complete an energizing circuit to said humidifier, and said thermistor being connected to the base of said one of said transistors for controlling conduction thereof.

3. The control device claimed in claim 2 wherein said circuit means further includes a second thermistor connected to the base of the other of said transistors for compensating for changes in the rate of heating and cooling of said thermistor connected to said base of said one of said transistors, said changes being caused by changes in temperature of said ambient air, so that operation of said humidifier occurs at essentially the same pressure drops regardless of said temperature of said ambient air.

4. The control device claimed in claim 3 wherein said thermistor connected to said base of said one of said transistors is a PTC thermistor and is connected between said base and collector of said one of said transistors, and said second thermistor is an NTC thermistor and is connected between said base and emitter of said other of said transistors.

* * * * *

UNITED STATES PATENT AND TRADEMARK OFFICE
CERTIFICATE OF CORRECTION

PATENT NO. : 4,382,433　　　　　　　　Page 1 of 2

DATED : May 10, 1983

INVENTOR(S) : George E. Hess et al.

It is certified that error appears in the above-identified patent and that said Letters Patent is hereby corrected as shown below:

The title page should be deleted to appear as per attached title page.

*Signed and Sealed this*

*Twenty-seventh* Day of *December 1983*

[SEAL]

*Attest:*

GERALD J. MOSSINGHOFF

*Attesting Officer*　　　*Commissioner of Patents and Trademarks*

United States Patent [19]

Hess et al.

[11] 4,382,433
[45] May 10, 1983

[54] COMBINED HUMIDISTAT AND ELECTRONIC AIR FLOW RESPONSIVE SWITCH

[75] Inventors: George E. Hess, St. Louis, Mo.; Donald E. Donnelly, Edwardsville, Ill.; Robert E. Reinwart, St. Louis, Mo.

[73] Assignee: Emerson Electric Co., St. Louis, Mo.

[21] Appl. No.: 370,982

[22] Filed: Apr. 22, 1982

[51] Int. Cl.³ .......................... F24F 3/14; G01F 1/68
[52] U.S. Cl. ...................................... 126/113; 73/204; 236/44 A
[58] Field of Search .......................... 126/113; 73/204; 62/176 E; 236/44 A, 44 R; 165/20

[56] References Cited

U.S. PATENT DOCUMENTS 3,193,641  7/1965  Krueger .......................... 73/336 X
3,989,486  11/1976 Baysinger ........................ 55/105
4,264,961  4/1981  Nishimura et al. ............... 73/204 X

OTHER PUBLICATIONS

Honeywell Installation Instructions for H49X1024, Form Number 95-6248, Apparent Date 1-64.
Honeywell Document Entitled "Humidifier Controllers", Form Number 60-2100, Apparent Date 11-75.

Primary Examiner—William E. Wayner
Attorney, Agent, or Firm—Paul A. Becker, Sr.

[57] ABSTRACT

An electronic air flow responsive switch is connected in circuit with a humidistat switch for controlling operation of a humidifier in a forced air heating system. The air flow responsive switch includes a self-heating PTC (positive temperature coefficient) thermistor which enables operation of the humidifier only when the humidistat switch is closed and there exists sufficient air flow for cooling the thermistor. The air flow responsive switch and humidistat switch are mounted in a single enclosure and include plug and cord arrangements for simplifying installation of the device.

4 Claims, 3 Drawing Figures